(12) United States Patent
Osogami et al.

(10) Patent No.: US 9,305,259 B2
(45) Date of Patent: Apr. 5, 2016

(54) APPARATUS, PROGRAM, AND METHOD FOR SOLVING MATHEMATICAL PROGRAMMING PROBLEM

(71) Applicant: International Business Machines Corporation, Armonk, NY (US)

(72) Inventors: Takayuki Osogami, Kanagawa-ken (JP); Hiroki Yanagisawa, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 322 days.

(21) Appl. No.: 13/888,498

(22) Filed: May 7, 2013

(65) Prior Publication Data
US 2013/0304688 A1 Nov. 14, 2013

(30) Foreign Application Priority Data
May 10, 2012 (JP) ................................. 2012-108827

(51) Int. Cl.
*G06N 5/02* (2006.01)
*G06F 17/11* (2006.01)
*G06F 17/12* (2006.01)

(52) U.S. Cl.
CPC ........ *G06N 5/02* (2013.01); *G06F 17/11* (2013.01); *G06F 17/12* (2013.01)

(58) Field of Classification Search
None
See application file for complete search history.

(56) References Cited

FOREIGN PATENT DOCUMENTS

| JP | 08-249005 A | 9/1996 |
|---|---|---|
| JP | 09-215192 A | 8/1997 |
| JP | 10-301603 A | 11/1998 |
| JP | 11-023016 A | 1/1999 |
| JP | 2000-075903 A | 3/2000 |
| JP | 2002-091504 A | 3/2002 |
| JP | 2003-084805 A | 3/2003 |
| JP | 2004-062440 | 2/2004 |
| JP | 2006-178626 A | 7/2006 |

OTHER PUBLICATIONS

Welsh06, An Introduction to the Kalman Filter, Tr 95-041 [online], Jul. 24, 2006 [retrieved on May 16, 2015]. Retrieved from the Internet<URL:http://www.google.com/url?sa=t&rct=j&q=&esrc=s&source=web&cd=1&cad=rja&uact=8& ved=0CB8QFjAA &url=https%03A%2F%2Fwww.cs.unc. edu%2F~welch%2Fmedia%2Fpdf%2Fkalman_intro.pdf>.*

* cited by examiner

Primary Examiner — Stanley K Hill
Assistant Examiner — Nathan Brown, Jr.
(74) Attorney, Agent, or Firm — Jeff Tang

(57) ABSTRACT

An apparatus and method for solving mathematical programming problems. The apparatus includes a first-time-point-solution generating unit generating at least one solution to a mathematical programming problem, a second-time-point-problem generating unit generating a plurality of mathematical programming problems to be on the basis of the solution to the mathematical programming problem to be solved at the first time point, a second-time-point optimum value calculating unit calculating an optimum value of each of a plurality of mathematical programming problems to be solved at the second time point, a relational expression estimating unit estimating a relational expression between the solution to the mathematical programming problem to be solved at the first time point and an optimum value of a mathematical programming problem to be solved at the second time point, and a correcting unit correcting the mathematical programming problem at the first time point based on the relational expression.

19 Claims, 10 Drawing Sheets

SOLUTION TO MATHEMATICAL PROGRAMMING PROBLEM TO BE SOLVED AT FIRST TIME POINT :

SCENARIO :

w' = DEMAND AT SECOND TIME POINT IS 0 (PROPORTION 0.8)

w" = DEMAND AT SECOND TIME POINT INCREASES (PROPORTION 0.2)

FIG. 5

SIMULATION TO BE EXECUTED

FIRST SIMULATION $S_1$ → $x'_1$, $w'$
SECOND SIMULATION $S_2$ → $x'_1$, $w''$
THIRD SIMULATION $S_3$ → $x''_1$, $w'$
FOURTH SIMULATION $S_4$ → $x''_1$, $w''$

→ : FROM EACH SIMULATION, FOUR MATHEMATICAL PROGRAMMING PROBLEMS TO BE SOLVED AT SECOND TIME POINT ARE GENERATED

FIG. 6

OPTIMUM VALUE y2 OF MATHEMATICAL PROGRAMMING PROBLEM TO BE SOLVED AT SECOND TIME POINT :

$$\begin{aligned}
\text{FIRST SIMULATION } S_1 &\rightarrow & y_2(x'_1, w') &= 0 & :\text{PROPORTION } 0.8 \\
\text{SECOND SIMULATION } S_2 &\rightarrow & y_2(x'_1, w'') &= 3 & :\text{PROPORTION } 0.2 \\
\text{THIRD SIMULATION } S_3 &\rightarrow & y_2(x''_1, w') &= 0 & :\text{PROPORTION } 0.8 \\
\text{FOURTH SIMULATION } S_4 &\rightarrow & y_2(x''_1, w'') &= 1 & :\text{PROPORTION } 0.2
\end{aligned}$$

FIG. 7

OBJECTIVE FUNCTION BEFORE CORRECTION $$\min. \quad 2s_1^{(1)} + x_1^{(1)} + 2s_1^{(2)} + x_1^{(2)}$$

CORRECTION BY LINEAR REGRESSION EQUATION $\quad y_2 = (-0.4x_1^{(1)} + 0.6)$

OBJECTIVE FUNCTION AFTER CORRECTION $$\min. \quad 2s_1^{(1)} + x_1^{(1)} + \lambda(-0.4x_1^{(1)} + 0.6) + (1-\lambda)(2s_1^{(2)} + x_1^{(2)})$$

$$\equiv \min. \quad 2s_1^{(1)} + x_1^{(1)} + (1-\lambda)(2s_1^{(2)} + x_1^{(2)}) + \lambda(-0.4x_1^{(1)})$$

APPARATUS, PROGRAM, AND METHOD FOR SOLVING MATHEMATICAL PROGRAMMING PROBLEM

CROSS-REFERENCE TO RELATED APPLICATION

This application claims priority under 35 U.S.C. §119 from Japanese Patent Application No. 2012-108827 filed May 10, 2012, the entire contents of which are incorporated herein by reference.

BACKGROUND OF THE INVENTION

1. Field of the Invention

The present invention relates to an apparatus, a program and a method for solving mathematical programming problems.

2. Description of Related Art

Conventionally, there is known a method for solving a mathematical programming problem to optimize a unit commitment program of a power generator, and the like. For example, JP2006-178626A describes a method for correcting an operation program for electric power or heat, including correcting an operation program created on the basis of a predicted value of the change quantity of an input parameter, when a true change quantity of the input parameter is revealed. Moreover, JP10-301603A describes a method for calculating a steam load allocation for a turbine by applying a linear programming problem to a plurality of turbines having different efficiency characteristics.

SUMMARY OF THE INVENTION

A first aspect of the present invention relates to an apparatus including a first-time-point-solution generating unit generating at least one solution to a mathematical programming problem to be solved at a first particular time point, a second-time-point-problem generating unit generating a plurality of mathematical programming problems to be solved at a second time point after the first time point on the basis of the solution to the mathematical programming problem to be solved at the first time point, a second-time-point optimum value calculating unit calculating an optimum value of each of a plurality of mathematical programming problems to be solved at the second time point, a relational expression estimating unit estimating a relational expression between the solution to the mathematical programming problem to be solved at the first time point and an optimum value of a mathematical programming problem to be solved at the second time point, and a correcting unit correcting the mathematical programming problem to be solved at the first time point on the basis of the relational expression.

A second aspect of the present invention includes a method for solving a mathematical programming problem. The method includes a first-time-point-solution generating step of generating at least one solution to a mathematical programming problem to be solved at a first particular time point, a second-time-point-problem generating step of generating a plurality of mathematical programming problems to be solved at a second time point after the first time point on the basis of the solution to the mathematical programming problem to be solved at the first time point, a second-time-point optimum value calculating step of calculating an optimum value of each of a plurality of mathematical programming problems to be solved at the second time point, a relational expression estimating step of estimating a relational expression between the solution to the mathematical programming problem to be solved at the first time point and an optimum value of a mathematical programming problem to be solved at the second time point, and a correcting step of correcting the mathematical programming problem to be solved at the first time point on the basis of the relational expression.

A third aspect of the present invention includes a computer readable storage medium tangibly embodying a computer readable program code having computer readable instructions which when implemented, cause a computer to carry out the steps of a method for solving a mathematical programming problem. The method includes a first-time-point-solution generating step of generating at least one solution to a mathematical programming problem to be solved at a first particular time point, a second-time-point-problem generating step of generating a plurality of mathematical programming problems to be solved at a second time point after the first time point on the basis of the solution to the mathematical programming problem to be solved at the first time point, a second-time-point optimum value calculating step of calculating an optimum value of each of a plurality of mathematical programming problems to be solved at the second time point, a relational expression estimating step of estimating a relational expression between the solution to the mathematical programming problem to be solved at the first time point and an optimum value of a mathematical programming problem to be solved at the second time point, and a correcting step of correcting the mathematical programming problem to be solved at the first time point on the basis of the relational expression.

Note that the above described summary of the invention has not listed all of the features required for the present invention. Moreover, sub-combinations of these features can also constitute the invention.

BRIEF DESCRIPTION OF THE DRAWINGS

FIG. 4 shows an example of a solution to a mathematical programming problem to be solved at a first time point, which is generated in step S12 by the optimum solution calculating apparatus 10 relating to the present embodiment;

FIG. 5 shows an example of the scenario which is acquired in step S14 by the optimum solution calculating apparatus 10 relating to the present embodiment;

FIG. 6 shows an example of the simulation which is executed in step S15 by the optimum solution calculating apparatus 10 relating to the present embodiment;

FIG. 7 shows an example of an optimum value for each of the plurality of mathematical programming problems to be solved at the second time point;

DETAILED DESCRIPTION OF THE PREFERRED EMBODIMENTS

When a mathematical programming problem is solved to optimize a program, it is difficult to create a problem by taking all possible future situations into consideration. It is therefore desirable to be able to generate a problem that reflects future situations to a higher degree of detail and yet is simplified to calculate a solution close to a true optimum.

Figure 1:
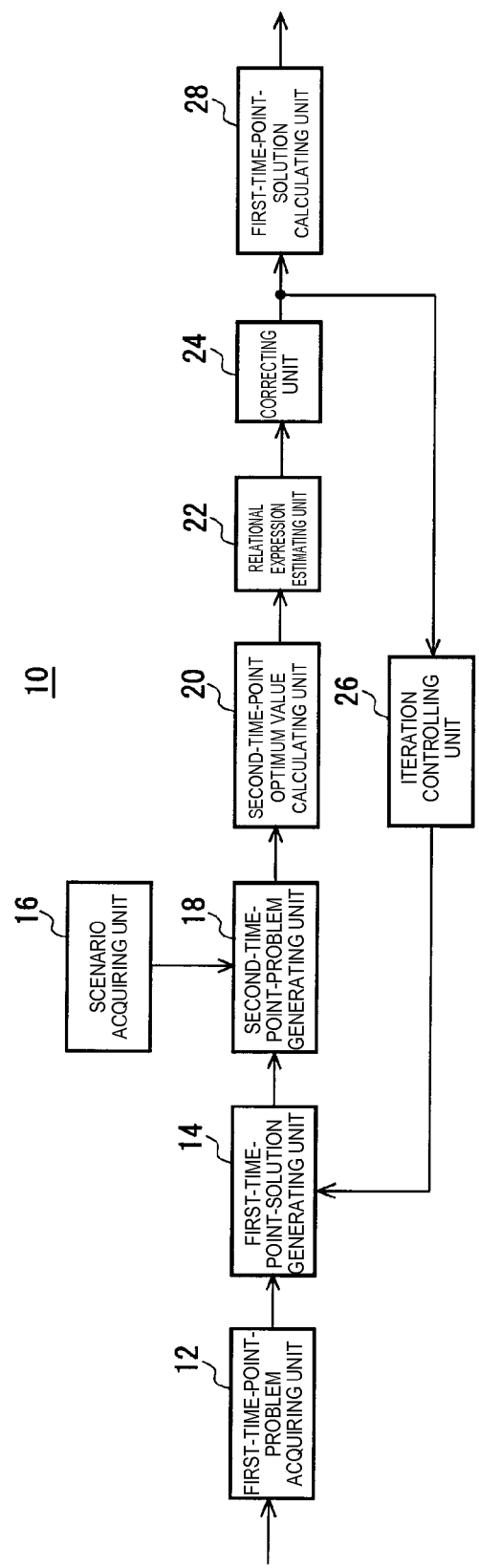
FIG. 1 shows a functional block diagram of an optimum solution calculating apparatus 10 relating to the present embodiment.

FIG. 1 shows a block diagram of an optimum solution calculating apparatus 10 relating to the present embodiment. The optimum solution calculating apparatus 10 is an apparatus for obtaining an optimum solution of a given mathematical programming problem, and is implemented, for example, by a computer, such as a server apparatus, executing a program.

The optimum solution calculating apparatus 10 can solve any mathematical programming problem such as an integer programming problem, a mixed integer programming problem, or a convex quadratic programming problem. Moreover, the subject to be optimized by the mathematical programming problem can be any program such as a unit commitment program of a power generator or a chiller, etc., a production program of steel plate in ironworks, a distribution route program or a warehouse layout program, and the like. Furthermore, the optimum solution calculating apparatus 10 solves mathematical programming problems at every interval of a constant time period (for example, every hour, every day or every month) to correct the program.

The optimum solution calculating apparatus 10 includes a first-time-point-problem acquiring unit 12, a first-time-point-solution generating unit 14, a scenario acquiring unit 16, a second-time-point-problem generating unit 18, a second-time-point optimum value calculating unit 20, a relational expression estimating unit 22, a correcting unit 24, and an iteration controlling unit 26, and a first-time-point-solution calculating unit 28.

The first-time-point-problem acquiring unit 12 acquires a mathematical programming problem to be solved at a particular first time point. By way of example, the first-time-point-problem acquiring unit 12 acquires a mathematical programming problem to be solved at the present time point when the mathematical programming problem is newly solved at every interval of a constant time period.

The first-time-point-solution generating unit 14 generates at least one solution to the mathematical programming problem to be solved at the first time point, which is acquired by the first-time-point-problem acquiring unit 12. By way of example, the first-time-point-solution generating unit 14 generates a plurality of solutions to the mathematical programming problem to be solved at the first time point. The scenario acquiring unit 16 acquires a scenario representing the variation of the circumstance to which the solution to the mathematical programming problem is applied. By way of example, the scenario acquiring unit 16 acquires a plurality of scenarios. In such a case, the scenario acquiring unit 16 can also generate a plurality of scenarios by using random numbers, etc.

The second-time-point-problem generating unit 18 simulates the circumstance, to which the solution to the concerned mathematical programming problem is applied, on the basis of the solution to the mathematical programming problem to be solved at the first time point and the scenario acquired by the scenario acquiring unit 16, and generates a plurality of mathematical programming problems to be solved at a second time point (for example, the next time point) after the first time point.

When a plurality of solutions to the mathematical programming problem the first time point is generated, the second-time-point-problem generating unit 18 generates a mathematical programming problem for each solution. Further, when a plurality of scenarios is generated, the second-time-point-problem generating unit 18 generates a mathematical programming problem for each scenario. Further, when a plurality of solutions to the mathematical programming problem to be solved at the first time point are generated, and further a plurality of scenarios are generated, the second-time-point-problem generating unit 18 generates a mathematical programming problem, for example, for each combination between all the solutions and scenarios.

The second-time-point optimum value calculating unit 20 calculates an optimum value of the mathematical programming problem to be solved at the second time point for each of a plurality of mathematical programming problems to be solved at the second time point, which are generated by second-time-point-problem generating unit 18.

The relational expression estimating unit 22 estimates a relational expression between the solution to the mathematical programming problem to be solved at the first time point and an optimum value of the mathematical programming problem to be solved at the second time point. To be more specific, the relational expression estimating unit 22 estimates a regression equation that represents a relation of an optimum value of the mathematical programming problem to be solved at the second time point with respect to the solution to the mathematical programming problem to be solved at the first time point. For example, the relational expression estimating unit 22 estimates a linear regression equation.

The correcting unit 24 corrects the mathematical programming problem to be solved at the first time point on the basis of the relational expression estimated by the relational expression estimating unit 22. To be more specific, the correcting unit 24 corrects an objective function in the mathematical programming problem to be solved at the first time point.

The iteration controlling unit 26 repeats the estimation of the relational expression again according to the corrected mathematical programming problem (objective function), which repeats the correction of the mathematical programming problem to be solved at the first time point. To be more specific, the iteration controlling unit 26 provides a mathematical programming problem corrected by the correcting unit 24 to the first-time-point-solution generating unit 14. Then, the iteration controlling unit 26 causes the first-time-point-solution generating unit 14, the scenario acquiring unit 16, the second-time-point-problem generating unit 18, the second-time-point optimum value calculating unit 20, and the relational expression estimation unit 22 to execute the processing thereof again. This allows the iteration controlling unit 26 to repeatedly cause the estimation of the relational expression to be performed again according to the corrected mathematical programming problem.

The first-time-point-solution calculating unit 28 calculates an optimum solution and an optimum value of the mathematical programming problem to be solved at the first time point on the basis of the mathematical programming problem corrected by the correcting unit 24 on the condition that the repetitive processing by the iteration controlling unit 26 has ended.

Figure 2:
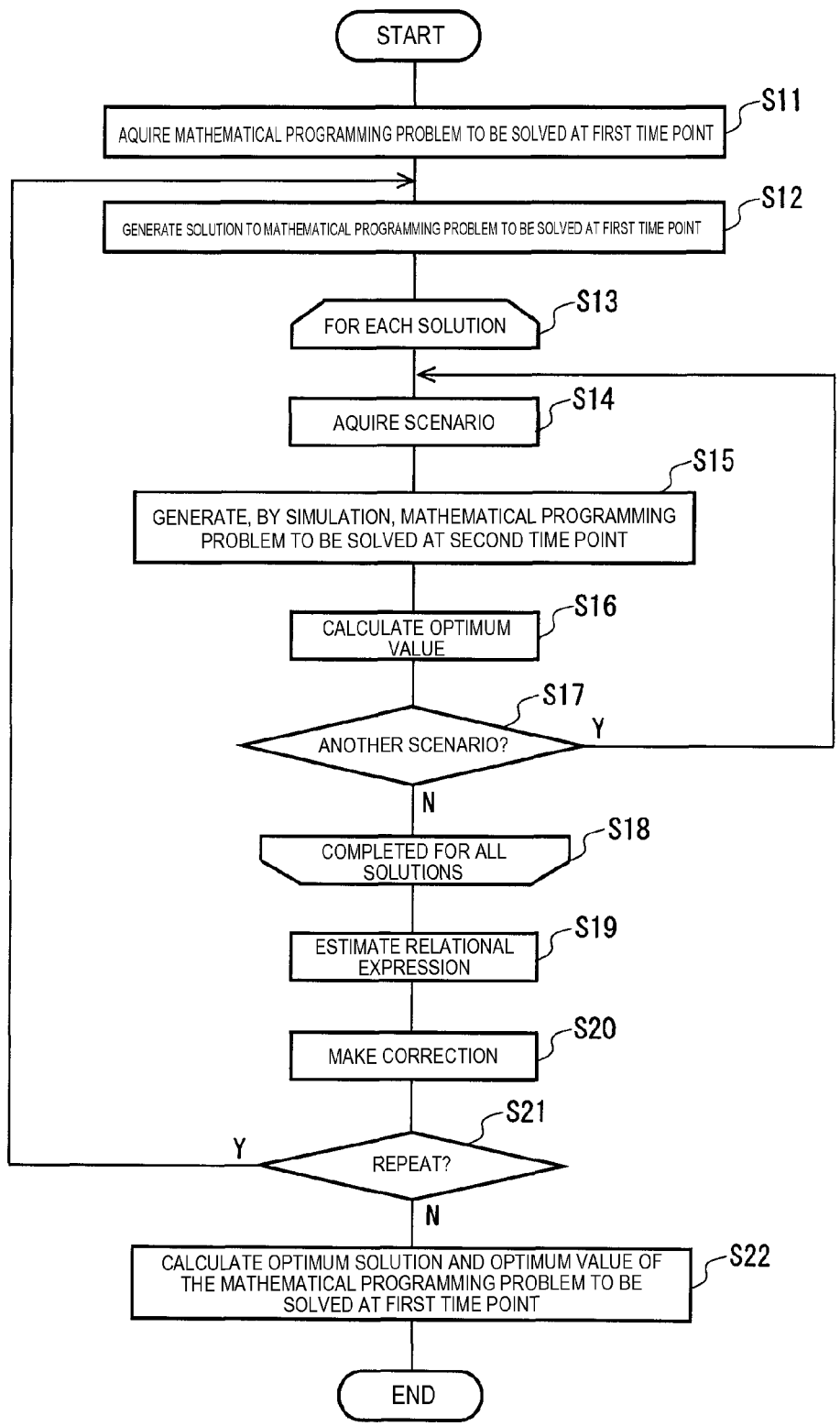
FIG. 2 shows a process flow chart of the optimum solution calculating apparatus 10 relating to the present embodiment.

FIG. 2 shows a processing flow of the optimum solution calculating apparatus 10 relating to the present embodiment.

The optimum solution calculating apparatus 10 executes the following processing from step S11 to step S22, for example, at every interval of a constant time period (for example, every hour, every day, or every month).

First, in step S11, the first-time-point-problem acquiring unit 12 acquires a mathematical programming problem to be solved at a first time point. The first-time-point-problem acquiring unit 12 acquires, for example, a mathematical programming problem as shown in the following Expression. The mathematical programming problem shown in Expression (1) represents the calculation of an optimum solution of a variable vector ($x_1$) to obtain a minimum value of an objective function ($c_1 x_1$) under the specified constraint.

[Expression 1]

$$\begin{aligned} \text{min.} \quad & c_1 x_1 \\ \text{s.t.} \quad & A_1 x_1 \leq b_1 \\ & \text{Other constraints} \end{aligned} \quad (1)$$

Note that the objective function of the mathematical programming problem to be solved at the first time point shown in Expression (1) is represented by a mathematical model including a variable vector term ($c_1^{(1)} x_1^{(1)}$) at a first time point, and a variable vector term ($c_1^{(2)} x_1^{(2)}$) at a second time point as shown in the following Expression (2).

[Expression 2]

$$\text{min. } c_1 x_1 \quad (2)$$

$$\Downarrow$$

$$\text{min. } c_1^{(1)} x_1^{(1)} + c_1^{(2)} x_1^{(2)}$$

Note that $x_1$ represents a variable vector of a mathematical programming problem to be solved at a first time point. The term $x_1^{(1)}$ represents a component of the variable vector at the first time point when the mathematical programming problem to be solved at the first time point is separated into a component at the first time point and a component at a second time point. The term $x_1^{(2)}$ represents a component of the variable vector at the second time point when the mathematical programming problem to be solved at the first time point is separated into a component at the first time point and a component at the second time point. Moreover, $c_1^{(1)}$ and $c_1^{(2)}$ represent constant parameters, respectively.

Next, in step S12, the first-time-point-solution generating unit 14 generates a plurality of solutions to the mathematical programming problem to be solved at the first time point. By way of example, the first-time-point-solution generating unit 14 calculates an optimum solution and alters a part of the calculated optimum solution to generate a plurality of solutions. Moreover, by way of example, the first-time-point-solution generating unit 14 generates a plurality of solutions and, from the plurality of solutions, selects some solutions which are close to the optimum solution. Further, the first-time-point-solution generating unit 14 can generate a solution at the first time point on the basis of an optimum solution which was solved at a past time point.

Next, the optimum solution calculating apparatus 10 executes the processing from step S14 to step S17 (a loop processing between step S13 and step S18) for each solution (each solution generated in step S12) to the mathematical programming problem to be solved at the first time point.

In the loop processing, first, in step S14, the scenario acquiring unit 16 acquires a scenario which represents how the circumstance to which the solution to the mathematical programming problem is applied varies between the first time point and the second time point. The scenario acquiring unit 16 can either call up a preregistered scenario or generate a scenario from random numbers.

For example, when the solution to the mathematical programming problem is applied to a unit commitment program of a power generator, the scenario acquiring unit 16 acquires a scenario on how the power demand varies, and the like. Moreover, for example, when the solution to the mathematical programming problem is applied to a delivery route program, the scenario acquiring unit 16 acquires a scenario on how the congestion level of the traffic network varies. Further, when the solution of the mathematical programming problem is applied to a large scale circumstance, the scenario acquiring unit 16 can acquire a scenario on a part of the concerned circumstance.

Next, in step S15, the second-time-point-problem generating unit 18 simulates the circumstance to which the solution to the mathematical programming problem is applied on the basis of the solution of the mathematical programming problem to be solved at the first time point and the scenario acquired in step S14. Then, the second-time-point-problem generating unit 18 generates a plurality of mathematical programming problems to be solved at the second time point. By way of example, the second-time-point-problem generating unit 18 simulates on a program a circumstance to which a solution to the mathematical programming problem to be solved at the first time point is applied and in which the variation indicated by the scenario has occurred. Then, the second-time-point-problem generating unit 18 generates parameters of the mathematical programming problem to be solved at a second time point after the first time point (for example, the next time point) from the simulation result.

Next, in step S16, the second-time-point optimum value calculating unit 20 calculates an optimum value of the mathematical programming problem to be solved at the second time point.

Next, in step S17, the scenario acquiring unit 16 judges whether or not to acquire another scenario. The scenario acquiring unit 16 returns the process to step S14 when acquiring another scenario (Yes in step S17). Then, the scenario acquiring unit 16 acquires another scenario in step S14 and repeats the processing. The scenario acquiring unit 16 proceeds to step S18 when it is not acquiring another scenario (No in step S17). The scenario acquiring unit 16 causes the process to proceed to step S18 without acquiring another scenario, for example, when the processing has been completed for all of a preregistered number (for example, ten) of the scenarios, or a predetermined time has elapsed since a first scenario was acquired.

Then, in step S18, when the optimum solution calculating apparatus 10 completes the processing from step S14 to step S17 for all of the plurality of solutions to the mathematical programming problem to be solved at the first time point, the process gets out of the loop processing.

Upon completion of the loop processing between step S13 and step S18, the process proceeds to step S19. In step S19, the relational expression estimating unit 22 estimates a relational expression between the solution to the mathematical programming problem to be solved at the first time point and an optimum value of the mathematical programming problem to be solved at the second time point. In the present embodiment, the relational expression estimating unit 22 estimates a linear regression equation that represents the relation of an optimum value of the mathematical programming problem to be solved at the second time point with respect to the solution to the mathematical programming problem to be solved at the first time point.

For example, let optimum values of each of the plurality of mathematical programming problems to be solved at the second time point be $y_{2\_1}, y_{2\_2}, y_{2\_3}, \ldots$. Moreover, let solutions to the mathematical programming problem to be solved at the first time point, which have provided the basis of the estimation of each of the plurality of mathematical programming problems to be solved at the second time point, be $x_{1\_1}, x_{1\_2}, x_{1\_3}, \ldots$. In this case, the relational expression estimating unit 22 plots points which each correspond to a combination of an optimum value and a solution on the X-Y coordinates with the solution x being in the X coordinate and the optimum value y being in the Y coordinate. Then, the relational expression estimating unit 22 fits a straight line on the plotted plurality of points and estimates the best fit straight line as the linear regression equation ($y_2 = \alpha x_1 + \beta$).

Next, in step S20, the correcting unit 24 corrects the mathematical programming problem to be solved at the first time point on the basis of the relational expression. In the present embodiment, the correcting unit 24 corrects an objective function in the mathematical programming problem to be solved at the first time point on the basis of the estimated linear regression equation. To be more specific, the correcting unit 24 corrects the objective function of the mathematical programming problem to be solved at the first time point as shown by the following Expression (3).

[Expression 3]

$$\text{min. } c_1^{(1)} x_1^{(1)} + c_1^{(2)} x_1^{(2)} \quad (3)$$

$$\Downarrow$$

$$\text{min. } c_1^{(1)} x_1^{(1)} + (1-\lambda) c_1^{(2)} x_1^{(2)} + \lambda(\alpha x_1^{(1)} + \beta)$$

Where, $0 < \lambda \leq 1$.

That is, the objective function in the mathematical programming problem to be solved at the first time point is represented by a mathematical model including a variable vector term at the first time point and a variable vector term at the second time point. For such objective function, the correcting unit 24 corrects and changes the term including the variable vector at second time point in the objective function into an expression including the variable vector at the first time point on the basis of the linear regression equation.

To be more specific, the correcting unit 24 adds a term of an estimated linear regression equation multiplied by an index $\lambda$ to the objective function. Further, the correcting unit 24 multiplies the variable term at the second time point in the objective function by a factor which is 1 subtracted by the index $\lambda$, that is, $(1-\lambda)$. That is, the correcting unit 24 alters a proportion between a degree of influence of the variable vector at the second time point and a degree of influence of the variable vector at the first time point in the term including the variable vector at the second time point in the objective function according to the index ($\lambda$) which reflects the result of the linear regression equation.

Note that $\lambda$ represents an index reflecting the result of the linear regression equation and is a real number more than 0 and not more than 1. The correcting unit 24 performs alteration, for example, according to the degree of influence that reflects the linear regression equation. By way of example, the correcting unit 24 increases $\lambda$ when a larger number of scenarios are generated to generate the linear regression equation. Moreover, by way of example, the correcting unit 24 determines the value on the basis of the value of $\lambda$ which was used in the past processing.

Next, in step S21, the iteration controlling unit 26 judges whether or not the mathematical programming problem (objective function) to be solved at the first time point is to be iteratively corrected. Upon judging that iterative correction is to be made (Yes in step S21), the iteration controlling unit 26 returns the process to step S12, and causes the processing from step S12 to be repeatedly executed according to the mathematical programming problem to be solved at the first time point after correction. As a result of this, the iteration controlling unit 26 can repeat the reestimation of the relational expression according to the corrected mathematical programming problem thereby repeating the correction of the mathematical programming problem to be solved at the first time point.

By way of example, the iteration controlling unit 26 performs the control to repeat the iterative processing until a predetermined time has elapsed from the start of the processing. Moreover, by way of example, the iteration controlling unit 26 can stop the repetitive processing if the correction of mathematical programming problem by the correcting unit 24 has converged (for example, the optimum solution or optimum value of the mathematical programming problem to be solved at the first time point becomes the same value).

Then, upon judging that iterative correction is not to be made (No in step S21), the iteration controlling unit 26 causes the process to proceed to step S22.

Next, in step S22, the first-time-point-solution calculating unit 28 calculates an optimum solution and an optimum value of the mathematical programming problem to be solved at the first time point on the basis of the corrected mathematical programming problem. Then, the optimum solution calculating apparatus 10 sets thus calculated optimum solution and optimum value as the operating program of a control apparatus and the like for controlling the circumstance to which the concerned mathematical programming problem is applied.

As so far described, according to the optimum solution calculating apparatus 10, the situation at the second time point (next time point) is estimated by simulation on the basis of a scenario so that the mathematical programming problem to be solved at a second time point is generated. Then, according to the optimum solution calculating apparatus 10, an optimum value of the mathematical programming problem to be solved at the second time point is subjected to a regression processing to reflect the result to the mathematical programming problem to be solved at the first time point (the present time point). In this way, the optimum solution calculating apparatus 10 can generate a problem that reflects future situations to a higher degree of detail and yet is simplified to calculate a solution close to a true optimum.

Figure 3:
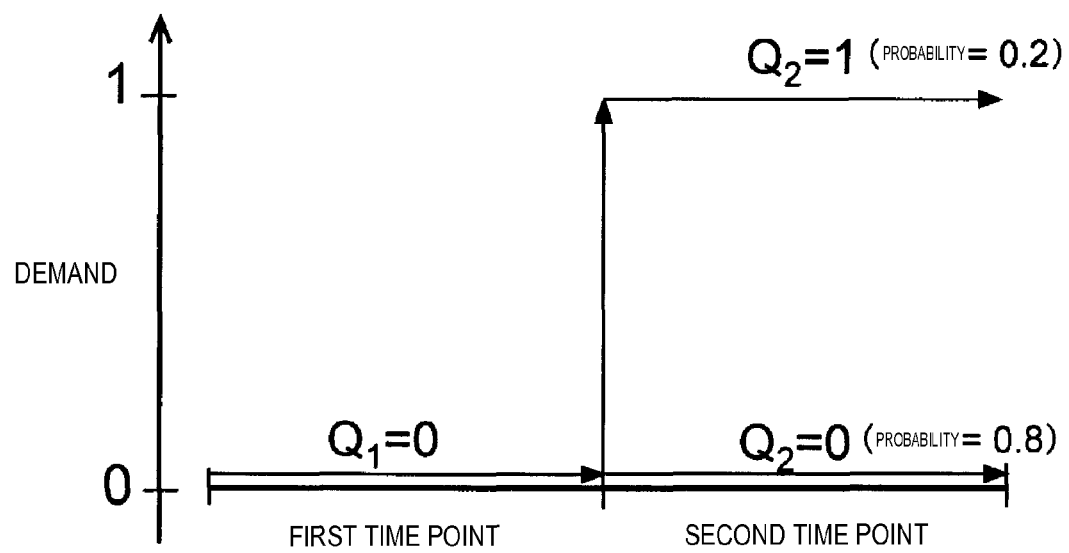
FIG. 3 shows an example of electric power demand at a first time point and a second time point in a program to control the switching of a power generator.

FIG. 3 shows an example of electric power demand at a first time point and a second time point in a program for controlling the switching of a power generator. Hereafter, an example of the method for calculating an optimum solution and an optimum value of a mathematical programming problem in the case of creating a control program for the switching of a power generator will be described.

The abscissa of FIG. 3 represents a first time point and a second time point. The first time point and the second time point are the unit of the interval at which the mathematical programming problem is newly solved and which is, for example, a period with a constant range (for example, one hour, one day, and one week).

The ordinate of FIG. 3 represents electric power demand Q. When demand exists in a certain period, Q=1, and when no demand exists in that period, Q=0. Note that $Q_1$ represents demand at the first time point, and $Q_2$ represents demand at the second time point.

The power generator is controlled such that the switch is On or Off when demand Q is 0, and the switch is On when demand Q is 1. Moreover, in the present example, forecasting of the demand at the second time point is performed at the first time point. To be specific, the demand at the second time point will be 0 at a probability of 0.8, and the demand at the second time point will be 1 at a probability of 0.2.

The following Expression (4) shows an example of the mathematical programming problem to be solved at the first time point for operating the power generator so as to fill the demand for electric power.

[Expression 4]

$$\begin{aligned} & \min. \; C_{turn}(s_1^{(1)} + s_1^{(2)}) + C_{keep}(x_1^{(1)} + x_1^{(2)}) \\ & \text{s.t.} \; x_1^{(1)} \geq \max\{Q_1\} \\ & x_1^{(2)} \geq \max\{Q_2\} \\ & x_1^{(1)} - x_1^{(0)} \leq s_1^{(1)} \\ & x_1^{(2)} - x_1^{(1)} \leq s_1^{(2)} \\ & x_1^{(0)} = 1 \\ & x_1^{(1)}, x_1^{(2)} \in \{0, 1\} \\ & s_1^{(1)}, s_1^{(2)} \in \{0, 1\} \end{aligned} \quad (4)$$

The term "$C_{turn}(s_1^{(1)}+s_1^{(2)})+C_{keep}(x_1^{(1)}+x_1^{(2)})$" in Expression (4) represents an objective function of the mathematical programming problem to be solved at the first time point. Where, $C_{turn}$ represents a constant parameter (cost) when the power generator, which was Off at the previous time point, is turned On, and $C_{keep}$ represents a constant parameter (cost) when the power generator is being On at that time point. Note that in the present example, description is made assuming that $C_{keep}=1$ and $C_{turn}=2$.

The terms $x_1^{(0)}, x_1^{(1)}, x_1^{(2)}, s_1^{(1)},$ and $s_1^{(2)}$ of Expression (4) are variable vectors of the mathematical programming problem to be solved at the first time point. Where, $x_1^{(0)}$ is a variable vector which is 1 when the power generator is On at a time point immediately before the first time point, and is 0 in any other cases. Similarly, $x_1^{(1)}$ is a variable vector which is 1 when the power generator is On at the first time point, and is 0 in any other cases; and $x_1^{(2)}$ is a variable vector which is 1 when the power generator is On at the second time point, and is 0 in any other cases.

Moreover, $s_1^{(1)}$ is a variable vector which is 1 when the power generator is Off at a time point immediately before the first time point and is turned On at the first time point, and is 0 in any other cases. Similarly, $s_1^{(2)}$ is a variable vector which is 1 when the power generator is Off at the first time point and is turned On at the second time point, and is 0 in any other cases.

The term "$x_1^{(1)} \geq \max\{Q_1\}$" is a constraint indicating that the variable vector $x_1^{(1)}$ is not less than a demand $Q_1$ at the first time point. Similarly, "$x_1^{(2)} \geq \max\{Q_2\}$" is a constraint indicating that the variable vector $x_1^{(2)}$ is not less than a demand $Q_2$ at the second time point.

The term "$x_1^{(1)} - x_1^{(0)} \leq s_1^{(1)}$" is a constraint indicating that the variable vector $s_1^{(1)}$ is not less than "$x_1^{(1)} - x_1^{(0)}$." Similarly, "$x_1^{(2)} - x_1^{(1)} \leq s_1^{(2)}$" is a constraint indicating that the variable vector $s_1^{(2)}$ is not less than "$x_1^{(2)} - x_1^{(1)}$."

The term "$x_1^{(0)}=1$" is a constraint indicating that $x_1^{(0)}$ is 1. The term "$x_1^{(1)}, x_1^{(2)} \in \{0, 1\}$" is a constraint indicating that $x_1^{(1)}$ and $x_1^{(2)}$ are 0 or 1. Similarly, "$s_1^{(1)}, s_1^{(2)} \in \{0, 1\}$" is a constraint indicating that $s_1^{(1)}$ and $s_1^{(2)}$ are 0 or 1.

The optimum solution to the mathematical programming problem to be solved at a first time point becomes as shown by the following Expression (5). That is, it is suggested that keeping the power generator being On at both of the first time point and the second time point will result in a minimum cost.

[Expression 5]

$$x_1^{(1)*}=1, x_1^{(2)*}=1, s_1^{(1)*}=0, s_1^{(2)*}=0 \quad (5)$$

Moreover, the optimum value of the cost of the power generator in this case is obtained by substituting the optimum solution into the objective function. Therefore, the optimum value (cost of the power generator) of the mathematical programming problem to be solved at the first time point becomes as shown by the following Expression (6).

[Expression 6]

$$2 \times (s_1^{(1)*} + s_1^{(2)*}) + 1 \times (x_1^{(1)*} + x_1^{(2)*}) = 2 \times (0+0) + 1 \times (1+1) \quad (6)$$
$$= 2$$

Where, $C_{turn} = 2,$ $C_{keep} = 1$

Next, it is assumed that the control at the first time point is performed according to the optimum solution of Expression (5), and the demand at the second time point is 0. In this case, the mathematical programming problem to be solved at the second time point becomes as shown by the following Expression (7).

[Expression 7]

$$\begin{aligned} & \min. \; 2s_2^{(2)} + x_2^{(2)} \\ & \text{s.t.} \; x_2^{(2)} \geq \max\{0\} = 0 \\ & x_2^{(2)} - x_1^{(1)*} \leq s_2^{(2)} \\ & x_1^{(1)*} = 1 \\ & x_2^{(2)} \in \{0, 1\} \\ & s_2^{(2)} \in \{0, 1\} \end{aligned} \quad (7)$$

The term "$2s_2^{(2)}+x_2^{(2)}$" represents the objective function of the mathematical programming problem to be solved at the second time point. The terms $x_2^{(2)}$ and $s_2^{(2)}$ are variable vectors included in the objective function of the mathematical programming problem to be solved at the second time point. Where, $x_2^{(2)}$ is a variable vector which becomes 1 when the power generator is On at the second time point, and 0 in any other cases. And $s_2^{(2)}$ is a variable vector which becomes 1 when the power generator is Off at the first time point and the power generator is turned On at the second time point, and 0 in any other cases.

The term "$x_2^{(2)} \geq \max\{0\}$" is a constraint indicating that the variable vector $x_2^{(2)}$ is not less than a demand $Q_2=0$ at the second time point. The term "$x_2^{(2)} - x_1^{(1)*} \leq s_2^{(2)}$" is a constraint indicating that the variable vector $s_2^{(2)}$ is not less than "$x_2^{(2)} - x_1^{(1)*}$." The term "$x_1^{(1)*}=1$" is a constraint indicating that $x_1^{(1)*}$ is 1. The term "$x_2^{(2)} \in \{0, 1\}$" is a constraint indicating that $x_2^{(2)}$ is 0 or 1. The term "$s_2^{(2)} \in \{0, 1\}$" is a constraint indicating that $s_2^{(2)}$ is 0 or 1.

The optimum solution and the optimum value (cost of the power generator) in the mathematical programming problem as described above becomes as shown by the following Expression (8).

[Expression 8]

$$\text{Optimum solution:} x_2^{(2)*}=0, s_2^{(2)*}=0$$

$$\text{Optimum value:} 0 \quad (8)$$

On the other hand, it is assumed that the control at the first time point is performed according to the optimum solution of Expression (5), and the demand at the second time point is 1. In such a case, the mathematical programming problem to be solved at the second time point becomes as shown by the following Expression (9).

[Expression 9]

$$\begin{aligned}
&\min. \quad 2s_2^{(2)} + x_2^{(2)} \quad (9)\\
&\text{s.t.} \quad x_2^{(2)} \geq \max\{1\} = 1\\
&\quad x_2^{(2)} - x_1^{(1)*} \leq s_2^{(2)}\\
&\quad x_1^{(1)*} = 1\\
&\quad x_2^{(2)} \in \{0, 1\}\\
&\quad s_2^{(2)} \in \{0, 1\}
\end{aligned}$$

The term "$x_2^{(2)} \geq \max\{1\}$" is a constraint indicating that the variable vector $x_2^{(2)}$ is not less than a demand $Q_2=1$ at the second time point. Note that the other conditions are the same as Expression (7).

The optimum solution and the optimum value (cost of the power generator) of the mathematical programming problem as described above becomes as shown by the following Expression (10).

[Expression 10]

$$\text{Optimum solution:} x_2^{(2)*}=1, s_2^{(2)*}=0$$

$$\text{Optimum value:} 1 \quad (10)$$

Next, the following Expression (11) shows an expected value of the sum of the costs at the first time point and at the second time point when the control at the first time point is performed according to the optimum solution of Expression (5), and the control at the second time point is performed according to the optimum solution of Expression (7) when the demand at the second time point is 0, and is performed according to the optimum solution of Expression (9) when the demand at the second time point is 1.

[Expression 11]

$$\begin{aligned}
E[2(s_1^{(1)*} + s_2^{(2)*}) + 1(x_1^{(1)*} + x_2^{(2)*})] &= 2s_1^{(1)*} + x_1^{(1)*} + E[2s_2^{(2)*} + x_2^{(2)*}] \quad (11)\\
&= 2 \cdot 0 + 1 + 0.2(2 \cdot 0 + 1) +\\
&\quad 0.8(2 \cdot 0 + 0)\\
&= 1.2
\end{aligned}$$

In Expression (11), E[X] represents an expected value of cost which reflects a demand forecast. In Expression (11), demand forecasting is performed only for the second time point (development from the first line to the second line of Expression (11)).

Here, the probability that the demand at the second time point $Q_2=0$ is 0.8, and the probability that the demand at the second time point $Q_2=1$ is 0.2. Therefore, the third line of Expression (11) represents an expression in which the optimum solution of the variable vector at the second time point when the demand is 1 is multiplied by a probability of 0.2, the optimum solution of the variable vector at the second time point when the demand is 0 is multiplied by 0.8, and the both are added together.

It is seen from such Expression (11) that when the control at the first time point is performed according to the optimum solution to the mathematical programming problem to be solved at the first time point, and the control at the second time point is performed according to the optimum solution to the mathematical programming problem to be solved at the second time point, if a demand forecast for the second time point is reflected, the expected value of the sum of the costs at the first time point and the second time point becomes 1.2.

In an ordinary processing, for example, the computing as described above is executed for the calculation of the optimum solution and optimum value of the mathematical programming problem in the case of creating a control program for the switching of a power generator.

Next, when creating a control program for the switching of a power generator as described above, an example of the method for calculating an optimum solution and an optimum value of a mathematical programming problem by an optimum solution calculating apparatus 10 relating to the present embodiment will be described.

FIG. 4 shows an example of a solution to the mathematical programming problem to be solved at a first time point, which is generated in step S12 by the optimum solution calculating apparatus 10 relating to the present embodiment. The optimum solution calculating apparatus 10 generates, for example, two solutions X'$_1$ and X"$_1$ as shown in FIG. 4 as the solution to the mathematical programming problem to be solved at the first time point in step S12 of the flow shown in FIG. 2.

In the first solution X'$_1$, the variable vector at the first time point X'$_1^{(1)}$ is 0, and the variable vector at the second time point X'$_1^{(2)}$ is 1. In the second solution X"$_1$, the variable vector at the first time point X"$_1^{(1)}$ is 1, and the variable vector at the second time point X"$_1^{(2)}$ is 1.

FIG. 5 shows an example of the scenario which is acquired in step S14 by the optimum solution calculating apparatus 10 relating to the present embodiment. The optimum solution calculating apparatus 10 generates, for example, two scenarios w' and w" as shown in FIG. 5 according to the probability given by demand forecasting, as the scenario in step S14 of the flow shown in FIG. 2. For example, when a large number of scenarios are generated, approximately 80 percent of them are the first scenario, and approximately 20 percent of them are the second scenario. Moreover, the optimum solution calculating apparatus 10 records the proportions at which respective scenarios has been generated. Here, it is assumed that the proportion of the first scenario is 0.8, the proportion of the second scenario is 0.2.

In the present example, the first scenario w' means that "the demand at the second time point is 0." The second scenario w" means that "the demand increases at the second time point."

FIG. 6 shows an example of the simulation which is executed in step S15 by the optimum solution calculating apparatus 10 relating to the present embodiment. The optimum solution calculating apparatus 10 executes, for example, four simulations $S_1$, $S_2$, $S_3$, and $S_4$ as shown in FIG. 6 in step S15 of the flow shown in FIG. 2.

The first simulation $S_1$ is a simulation in the case where the power generator is controlled according to the first solution $X'_1$ at the first time point and the circumstance has changed according to the first scenario w' at the second time point. The second simulation $S_2$ is a simulation in the case where the power generator is controlled according to the first solution $X'_1$ at the first time point and the circumstance has changed according to the second scenario W' at the second time point.

The third simulation $S_3$ is a simulation in the case where the power generator is controlled according to the second solution $X'_2$ at the first time point and the circumstance has changed according to the first scenario w' at the second time point. The fourth simulation $S_4$ is a simulation in the case where the power generator is controlled according to the second solution $X'_2$ at the first time point and the circumstance has changed according to the second scenario w" at the second time point.

As the result of executing the first to fourth simulations $S_1$ to $S_4$ as described above, the optimum solution calculating apparatus 10 can generate four mathematical programming problems to be solved at the second time point.

FIG. 7 shows an example of the optimum value of each of the mathematical programming problems to be solved at the second time point. The optimum solution calculating apparatus 10 calculates, in step S16 of the flow shown in FIG. 2, optimum values of the mathematical programming problems obtained from the result of each simulation.

The optimum solution calculating apparatus 10, by way of example, calculates out 0 as an optimum value $y_2$ of the mathematical programming problem obtained by executing the first simulation $S_1$. Moreover, by way of example, the optimum solution calculating apparatus 10 calculates out 3 as the optimum value $y_2$ of the mathematical programming problem obtained by executing the second simulation $S_2$.

Moreover, by way of example, the optimum solution calculating apparatus 10 calculates out 0 as an optimum value $y_2$ of the mathematical programming problem obtained by executing the third simulation $S_3$. Moreover, by way of example, the optimum solution calculating apparatus 10 calculates out 1 as an optimum value $y_2$ of the mathematical programming problem obtained by executing the fourth simulation $S_4$.

Note that while, in the present example, an optimum value of the mathematical programming problem to be solved at the second time point is calculated by a prior art technology, the optimum solution calculating apparatus 10 can calculate an optimum value by recursively applying the processing from step S11 to step S22 even for the mathematical programming problem to be solved at the second time point.

Figure 8:
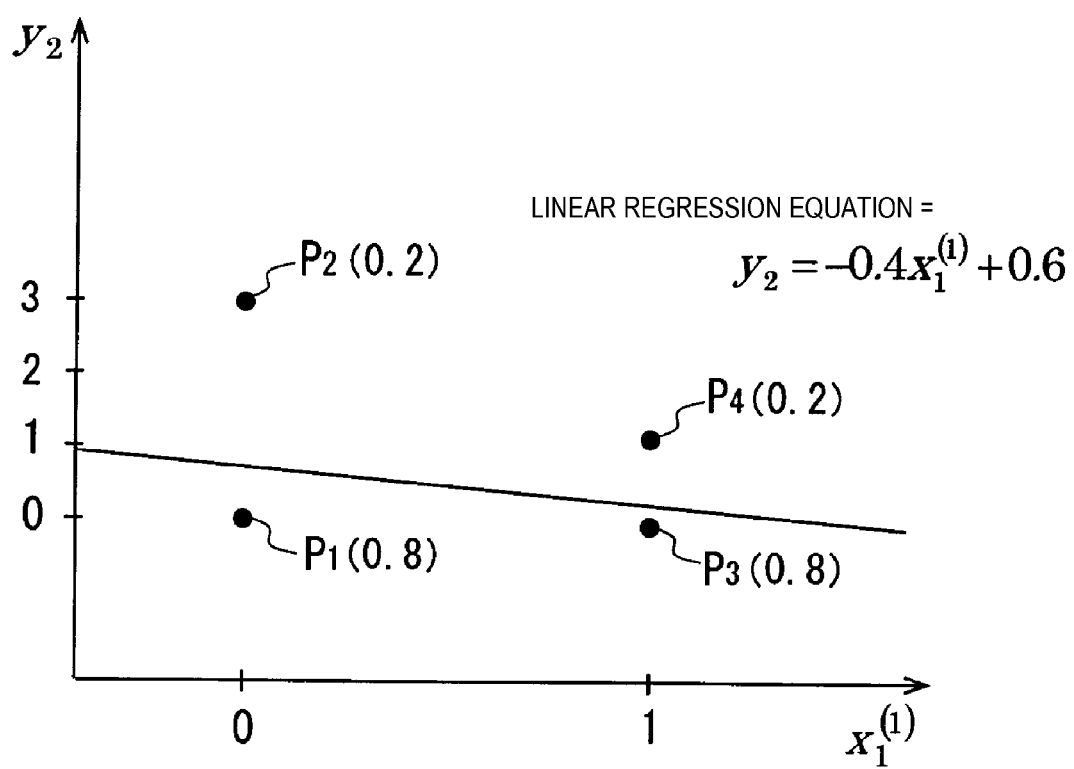
FIG. 8 shows a graph of a linear regression equation representing the relation of an optimum value of the mathematical programming problem to be solved at the second time point with respect to a variable vector of the mathematical programming problem to be solved at the first time point.

FIG. 8 shows a graph of a linear regression equation representing the relation of an optimum value $y_2$ of the mathematical programming problem to be solved at the second time point with respect to a variable vector $x_1^{(1)}$ at the first time point of the mathematical programming problem to be solved at the first time point. The optimum solution calculating apparatus 10, in step S19 shown in FIG. 2, estimates a linear regression equation on the basis of the each optimum value of the plurality of mathematical programming problems to be solved at the second time point, and the solution to the mathematical programming problem to be solved at the first time point which provided the basis for the estimation of each of the plurality of mathematical programming problems to be solved at the second time point.

For example, points P each represented as a combination of an optimum value of the mathematical programming problems to be solved at the second time point and a variable vector at the first time point of the mathematical programming problem to be solved at the first time point are plotted on X-Y coordinates. Moreover, the recorded proportions of the scenarios are allocated to each point and are recorded.

In the present example, the optimum solution calculating apparatus 10 plots the point $P_1=(0, 0)$, which is represented as a combination of an optimum value of the mathematical programming problem obtained by executing the first simulation $S_1$ and a corresponding variable vector at the first time point, on the X-Y coordinates. The optimum solution calculating apparatus 10 records a proportion of 0.8, which is the proportion of the scenario by the simulation $S_1$, in conjunction with the point $P_1$.

Moreover, in the present example, the optimum solution calculating apparatus 10 plots a point $P_2=(0, 3)$, which is represented as a combination of an optimum value of the mathematical programming problem obtained by executing the second simulation $S_2$ and a corresponding variable vector at the first time point, on the X-Y coordinates. The optimum solution calculating apparatus 10 records a proportion of 0.2, which is the proportion of the scenario by the simulation $S_2$, in conjunction with the point $P_2$.

Moreover, in the present example, the optimum solution calculating apparatus 10 plots a point $P_3=(1, 0)$, which is represented as a combination of an optimum value of the mathematical programming problem obtained by executing the third simulation $S_3$, and a corresponding variable vector at the first time point, on the X-Y coordinates. The optimum solution calculating apparatus 10 records a proportion of 0.8, which is the proportion of the scenario by the simulation $S_3$ in conjunction with the point $P_3$.

Moreover, in the present example, the optimum solution calculating apparatus 10 plots a point $P_4=(1, 1)$, which is represented as a combination of an optimum value of the mathematical programming problem obtained by executing the fourth simulation $S_4$ and a corresponding variable vector at the first time point, on the X-Y coordinates. The optimum solution calculating apparatus 10 records a proportion of 0.2, which is the proportion of the scenario by the simulation $S_4$, in conjunction with the point $P_4$.

Then, the optimum solution calculating apparatus 10 estimates a linear regression equation ($y_2=\alpha x_1+\beta$) on the basis of each point that has been plotted as described above. In the present example, the optimum solution calculating apparatus 10 has estimated a linear regression equation, "$y_2=-0.4x_1^{(1)}+0.6$."

Here, the optimum solution calculating apparatus 10 determines the coefficients ($\alpha=-0.4$, $\beta=0.6$) of the linear regression equation by minimizing the sum of weighted squared errors. To be more specific, the optimum solution calculating apparatus 10 determines the values of $\alpha$ and $\beta$ so as to minimize the total sum of each quantity obtained by multiplying the square of the difference between the linear regression equation and the value of the y coordinate of each point by the proportion of scenario recorded in conjunction with each point. In the present example, the optimum solution calculating apparatus 10 has calculated out $\alpha$ and $\beta$ which minimize the following Expression (12).

[Expression 12]

$$0.2(\beta-3)^2+0.8\beta^2+0.2(\alpha+\beta-1)^2+0.8(\alpha+\beta)^2 \qquad (12)$$

Figure 9:
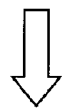
FIG. 9 shows an example of objective functions before and after correction in the mathematical programming problem to be solved at the first time point.

FIG. 9 shows an example of objective functions before and after correction in the mathematical programming problem to be solved at the first time point. The optimum solution calculating apparatus 10 corrects, in step S20 shown in FIG. 2, the objective function of the mathematical programming problem to be solved at the first time point on the basis of the linear regression equation.

It is assumed that the calculated linear regression equation is "$y_2=-0.4x_1^{(1)}+0.6$." In this case, the optimum solution calculating apparatus 10 adds a term "$\lambda(-0.4x_1^{(1)}+0.6)$," which is obtained by multiplying the linear regression equation by an index $\lambda$ that reflects the result of the linear regression equation, to the objective function before correction. Where, the index $\lambda$ indicates the degree of influence of the linear regression equation on the concerned objective function, and has a value more than 0 and not more than 1.

The optimum solution calculating apparatus 10 decreases the degree of influence of the variable vector term at the second time point in the objective function before correction according to the degree of influence of the linear regression equation on the concerned objective function. That is, the optimum solution calculating apparatus 10 decreases the degree of influence of the variable vector term at the second time point as the influence of the linear regression equation on the concerned objective function increases. To be specific, the optimum solution calculating apparatus 10 multiplies the variable vector term at the second time point in the objective function before correction by $(1-\lambda)$.

For example, it is assumed that the original objective function is the following Expression (13).

[Expression 13]

$$\min. 2s_1^{(1)}+x_1^{(1)}+2s_1^{(2)}+x_1^{(2)} \tag{13}$$

In this case, the optimum solution calculating apparatus 10 corrects the objective function as shown by the following Expression (14).

[Expression 14]

$$\min. 2s_1^{(1)}+x_1^{(1)}+(1-\lambda)(2s_1^{(2)}+x_1^{(2)})+\lambda(-0.4x_1^{(1)}+0.6) \tag{14}$$

Where, the parameter term ($\beta=0.6$) of the objective function after correction has no influence on the computing of the optimum solution and optimum value. Therefore, in the present example, the optimum solution calculating apparatus 10 can correct the objective function as shown by the following Expression (15).

[Expression 15]

$$\min. 2s_1^{(1)}+x_1^{(1)}+(1-\lambda)(2s_1^{(2)}+x_1^{(2)})+\lambda(-0.4x_1^{(1)}) \tag{15}$$

As so far described, an optimum solution in the mathematical programming problem in which the objective function has been corrected becomes as shown by the following Expression (16).

[Expression 16]

$$\text{Optimum solution:} x_1^{(1)*}=0, x_1^{(2)*}=1, s_1^{(1)*}=0, s_1^{(2)*}=1 \tag{16}$$

Moreover, when the control at the first time point is performed according to Expression (16), and the control at the second time point is performed according to the optimum solution to the mathematical programming problem to be solved at the second time point, if a forecast demand for the second time point is reflected, the expected value of the sum of the costs at the first time point and the second time point becomes as shown by the following Expression (17).

[Expression 17]

$$E[2(s_1^{(1)*}+s_2^{(2)*})+1(x_1^{(1)*}+x_2^{(2)*})] = 2s_1^{(1)*}+x_1^{(1)*}+E[2s_2^{(2)*}+x_2^{(2)*}] \tag{17}$$
$$= 2 \cdot 0 + 0 + 0.2(2 \cdot 1 + 1) +$$
$$0.8(2 \cdot 0 + 0)$$
$$= 0.6$$

As so far described, the optimum value (the cost of the power generator) of the mathematical programming problem in which the objective function has been corrected becomes 0.6. This is smaller than a value of 1.2 which is the optimum value calculated in a usual processing shown in Expression (11).

As so far described, according to the optimum solution calculating apparatus 10, the situation at the second time point is estimated by simulation on the basis of a scenario so that the mathematical programming problem to be solved at the second time point is generated, and an optimum value of the mathematical programming problem to be solved at the second time point is subjected to a regression processing to correct the mathematical programming problem to be solved at the first time point. In this way, the optimum solution calculating apparatus 10 can generate a problem that reflects future situations to a higher degree of detail and yet is simplified to calculate a solution close to a true optimum.

Figure 10:
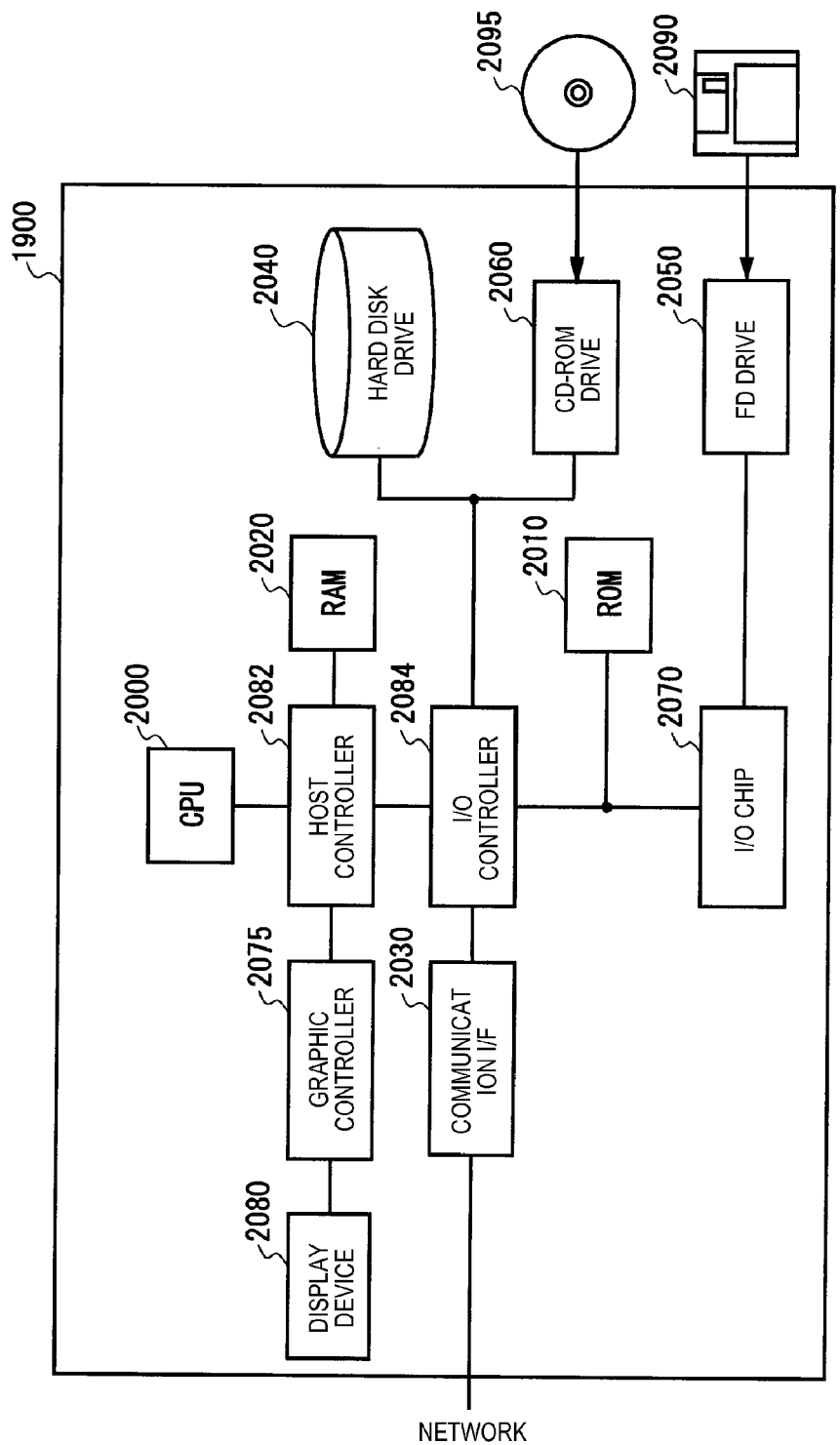
FIG. 10 shows an example of hardware configuration of a computer 1900 relating to the present embodiment.

FIG. 10 shows an example of hardware configuration of a computer 1900 relating to the present embodiment. The computer 1900 relating to the present embodiment includes: a CPU peripheral unit having a CPU 2000, a RAM 2020, a graphic controller 2075, and a display device 2080 which are interconnected by a host controller 2082; an I/O unit having a communication interface 2030, a hard disk drive 2040, and a CD-ROM drive 2060 which are connected to the host controller 2082 by an I/O controller 2084; and a legacy I/O unit having a ROM 2010, a flexible disk drive 2050, and an I/O chip 2070 which are connected to the I/O controller 2084.

The host controller 2082 connects the RAM 2020 with the CPU 2000 and the graphic controller 2075 which make access to the RAM 2020 at a high transfer rate. The CPU 2000 operates on the basis of a program stored in the ROM 2010 and the RAM 2020 to perform the control of each unit. The graphic controller 2075 acquires image data, which is generated by the CPU 2000, etc. on a frame buffer provided in the RAM 2020, and causes the data to be displayed on the display device 2080. Instead of this, the graphic controller 2075 can incorporate a frame buffer for storing image data generated by the CPU 2000, etc.

The I/O controller 2084 connects the host controller 2082 with the communication interface 2030, the hard disk drive 2040, and the CD-ROM drive 2060 which are relatively high speed I/O devices. The communication interface 2030 communicates with other devices via a network. The hard disk drive 2040 stores programs and data which are used by the CPU 2000 in the computer 1900. The CD-ROM drive 2060 reads out programs or data from the CD-ROM 2095, and provides them to the hard disk drive 2040 via the RAM 2020.

Moreover, the I/O controller 2084 is connected with the ROM 2010, the flexible disk drive 2050, and the I/O chip 2070 which are relatively low speed I/O devices. The ROM 2010 stores a boot program which is to be executed by the computer 1900 at the time of activation, and/or programs which are dependent on the hardware of the computer 1900. The flexible disk drive 2050 reads out programs or data from the flexible disk 2090, and provides them to the hard disk drive 2040 via the RAM 2020. The I/O chip 2070 connects the flexible disk drive 2050 to the I/O controller 2084, and connects various I/O devices to the I/O controller 2084 via, for example, a parallel port, a serial port, a keyboard port, a mouse port, and the like.

The program which is provided to the hard disk drive 2040 via the RAM 2020 is provided by a user as being stored in a recording medium such as the flexible disk 2090, the CD-ROM 2095, or an IC card, etc. The program is read out from the recording medium, and is installed in the hard disk drive 2040 in the computer 1900 via the RAM 2020, and is executed in the CPU 2000.

The program which is installed in the computer 1900 and causes the computer 1900 to function as the optimum solution calculating apparatus 10 comprises a first-time-point-problem acquiring module, a first-time-point-solution generating module, a scenario acquiring module, a second-time-point-problem generating module, a second-time-point optimum value calculating module, a relational expression estimating module, a correcting module, an iteration controlling module, and a first-time-point-solution calculating module. These programs or modules work on the CPU 2000, etc. to make the computer 1900 function as the first-time-point-problem acquiring unit 12, the first-time-point-solution generating unit 14, the scenario acquiring unit 16, the second-time-point-problem generating unit 18, the second-time-point optimum value calculating unit 20, the relational expression estimating unit 22, the correcting unit 24, the iteration controlling unit 26, and the first-time-point-solution calculating unit 28, respectively.

Upon being read into the computer 1900, the information processing described in these programs functions as the first-time-point-problem acquiring unit 12, the first-time-point-solution generating unit 14, the scenario acquiring unit 16, the second-time-point-problem generating unit 18, the second-time-point optimum value calculating unit 20, the relational expression estimating unit 22, the correcting unit 24, the iteration controlling unit 26, and the first-time-point-solution calculating unit 28, which are concrete means in which software and various hardware resources described above cooperate. Thus, by implementing computing or processing of information in accordance with the purpose of use of the computer 1900 in the present embodiment with the above described concrete means, a peculiar optimum solution calculating apparatus 10 in accordance with the purpose of use is constructed.

By way of example, when communication is performed between the computer 1900 and an external apparatus, etc., the CPU 2000 executes a communication program loaded on the RAM 2020, and gives instructions of communication processing to the communication interface 2030 on the basis of the processing contents described in the communication program. Under the control by the CPU 2000, the communication interface 2030 reads out transmission data stored on a transmission buffer region, etc. provided on a storage device such as the RAM 2020, the hard disk drive 2040, the flexible disk 2090 or the CD-ROM 2095 to transmit it to a network, or writes the reception data received from the network into a reception buffer region provided on a storage device, and the like. Thus, the communication interface 2030 can transfer transmission/reception data to and from a storage device through a DMA (direct memory access) scheme, and in place of this, the CPU 2000 can read out data from a storage device or a communication interface 2030 at the origin of transfer, and write the data into a communication interface 2030 or a storage device at the destination of transfer, thereby transferring transmit/receive data.

Moreover, the CPU 2000 loads all or necessary part of the files or database stored in an external storage device such as the hard disk drive 2040, the CD-ROM drive 2060 (the CD-ROM 2095), the flexible disk drive 2050 (the flexible disk 2090) on the RAM 2020 by a DMA transfer, etc. and performs various processing on the data on the RAM 2020. Then, the CPU 2000 writes back the data which has been processed into the external storage device by a DMA transfer, etc. In such processing, since the RAM 2020 can be regarded as a device that temporarily retains the contents of the external storage device, the RAM 2020 and the external storage device, etc. are generically referred to as a memory, storage unit, or storage device, etc. in the present embodiment. Various information in the present embodiment such as various programs, data, tables, and databases are stored on such a storage device and are subject to information processing. Note that the CPU 2000 can retain a part of the RAM 2020 in a cache memory, and perform read/write on the cache memory. Since, even in such a configuration, the cache memory assumes a part of the function of the RAM 2020, it is supposed in the present embodiment that, unless otherwise specifically distinguished, the cache memory is included in the RAM 2020, the memory, and/or the storage device.

Moreover, the CPU 2000 performs various processing including various computing, information processing, conditional judgment, information searching/replacing, and the like which are described in the present embodiment, and are specified by the instruction sequence of the program, on the data read out from the RAM 2020, thereafter writing back the data into the RAM 2020. For example, when performing conditional judgment, the CPU 2000 judges whether or not various variables shown in the present embodiment satisfy conditions such as that they are larger than, smaller than, not less than, not more than, or equal to other variables or parameters, and if a condition is established (or if the condition is not established), causes the process to be branched to a different instruction sequence, or to call up a sub-routine.

Moreover, the CPU 2000 can search the information stored in the files or databases, etc. in a storage device. For example, in the case where a plurality of entries are stored in a storage device with attribute values of a first attribute being assigned to correspond to attribute values of a second attribute, respectively, the CPU 2000 can obtain an attribute value of the second attribute assigned to correspond to a first attribute that satisfies a predetermined condition by searching an entry, in which the attribute value of the first attribute agrees with a specified condition, from a plurality of entries stored in a storage device, and reading out the attribute value of the second attribute stored in the entry.

The programs or modules which have been shown so far can be stored in an external recording medium. As the recording medium, besides the flexible disk 2090 and the CD-ROM 2095, it is possible to use optical recording media such as DVDs or CDs, magneto-optical media such as MOs, tape media, semiconductor memories such as IC cards, and so on. Moreover, a storage device such as a hard disk or RAM which is provided in a server system connected to a dedicated communication network or the Internet can be used to provide programs to the computer 1900 via the network.

Although the present invention has been described so far by using embodiment of the present invention, the technical scope of the present invention will not be limited to the range of description in the above described embodiment. It will be apparent to persons skilled in the art that various modifications or improvements can be made to the above described embodiment. It is also apparent from the description of the scope of claims that such modified and improved embodiment can also be included in the technical scope of the present invention.

It should be noted that the orders of execution of each processing such as operations, procedures, steps, and stages in an apparatus, system, program, and method described in the scope of claims, description, and drawings are not explicitly stated in a special manner such as "further forward," "prior to," etc., and the each processing can be implemented in an arbitrary order unless the output of the former processing is used in the processing of the later processing. Even if description is made by conveniently using terms such as "first," "next," and so on relating to the operation flow in the scope of claims, description, and drawings, it is not intended that operating in such order is essential.

We claim:

1. An apparatus for solving mathematical programming problems, comprising:
    a first-time-point-solution generating unit generating at least one solution to a mathematical programming problem to be solved at a first particular time point;
    a second-time-point-problem generating unit generating a plurality of mathematical programming problems to be solved at a second time point after the first time point on the basis of the solution to the mathematical programming problem to be solved at the first time point;
    a second-time-point optimum value calculating unit calculating an optimum value of each of a plurality of mathematical programming problems to be solved at the second time point;
    a relational expression estimating unit estimating a relational expression between the solution to the mathematical programming problem to be solved at the first time point and an optimum value of a mathematical programming problem to be solved at the second time point;
    a correcting unit correcting the mathematical programming problem to be solved at the first time point on the basis of the relational expression; and
    a scenario acquiring unit acquiring a scenario representing a variation of a circumstance to which the solution to the mathematical programming problem is applied, wherein the second-time-point-problem generating unit performs simulation on the basis of the scenario to generate parameters of the mathematical programming problems to be solved at the second time point.

2. The apparatus according to claim 1, wherein the correcting unit corrects an objective function in the mathematical programming problem to be solved at the first time point.

3. The apparatus according to claim 2, further comprising:
    a first-time-point-solution calculating unit calculating an optimum solution to the mathematical programming problem to be solved at the first time point on the basis of the corrected objective function.

4. The apparatus according to claim 3, wherein the first-time-point-solution calculating unit generates a plurality of solutions to the mathematical programming problem to be solved at the first time point.

5. The apparatus according to claim 4, further comprising:
    an iteration controlling unit repeating the estimation of the relational expression again according to the corrected mathematical programming problem, thus repeating the correction of the mathematical programming problem to be solved at the first time point.

6. The apparatus according to claim 5, wherein the scenario acquiring unit acquires a plurality of the scenarios, and the second-time-point-problem generating unit generates the mathematical programming problem to be solved at the second time point for each of the plurality of scenarios.

7. The apparatus according to claim 1, wherein the relational expression estimating unit estimates a regression equation that represents a relation of an optimum value of the mathematical programming problem to be solved at the second time point with respect to the solution to the mathematical programming problem to be solved at the first time point.

8. The apparatus according to claim 7, wherein the objective function in the mathematical programming problem to be solved at the first time point is represented by a mathematical model including a variable vector term at the first time point and a variable vector term at a second time point, and the correcting unit corrects and changes the variable vector term at the second time point in the objective function into an expression including the variable vector at the first time point on the basis of the regression equation.

9. The apparatus according to claim 8, wherein the correcting unit alters a proportion between a degree of influence of the variable vector at the second time point and a degree of influence of the variable vector at the first time point in the term including the variable vector at the second time point in the objective function depending on the index which reflects the result of the regression equation.

10. A method for solving mathematical programming problems, comprising:
    generating at least one solution to a mathematical programming problem to be solved at a first particular time point in a first-time-point-solution generating step;
    generating a plurality of mathematical programming problems to be solved at a second time point after the first time point on the basis of the solution to the mathematical programming problem to be solved at the first time point in a second-time-point-solution generating step;
    calculating an optimum value of each of a plurality of mathematical programming problems to be solved at the second time point;
    estimating a relational expression between the solution to the mathematical programming problem to be solved at the first time point and an optimum value of a mathematical programming problem to be solved at the second time point;
    correcting the mathematical programming problem to be solved at the first time point on the basis of the relational expression; and
    acquiring a scenario representing a variation of a circumstance to which the solution to the mathematical programming problem is applied, wherein the second-time-point-problem generating step performs simulation on the basis of the scenario to generate parameters of the mathematical programming problems to be solved at the second time point.

11. The method according to claim 10, wherein the correcting step corrects an objective function in the mathematical programming problem to be solved at the first time point.

12. The method according to claim 11, further comprising:
    a first-time-point-solution calculating step of calculating an optimum solution to the mathematical programming problem to be solved at the first time point on the basis of the corrected objective function.

13. The method according to claim 12, wherein the first-time-point-solution calculating step generates a plurality of solutions to the mathematical programming problem to be solved at the first time point.

14. The method according to claim 13, further comprising:
    an iteration controlling step of repeating the estimation of the relational expression again according to the corrected mathematical programming problem, thus repeating the correction of the mathematical programming problem to be solved at the first time point.

15. The method according to claim 14, wherein the scenario acquiring step acquires a plurality of the scenarios, and the second-time-point-problem generating step generates the mathematical programming problem to be solved at the second time point for each of the plurality of scenarios.

16. The method according to claim 10, wherein the relational expression estimating step estimates a regression equation that represents a relation of an optimum value of the mathematical programming problem to be solved at the second time point with respect to the solution to the mathematical programming problem to be solved at the first time point.

17. The method according to claim 16, wherein the objective function in the mathematical programming problem to be solved at the first time point is represented by a mathematical model including a variable vector term at the first time point and a variable vector term at a second time point, and the correcting step corrects and changes the variable vector term at the second time point in the objective function into an expression including the variable vector at the first time point on the basis of the regression equation.

18. The method according to claim 17, wherein the correcting step alters a proportion between a degree of influence of the variable vector at the second time point and a degree of influence of the variable vector at the first time point in the term including the variable vector at the second time point in the objective function depending on the index which reflects the result of the regression equation.

19. A computer readable storage medium tangibly embodying a computer readable program code having computer readable instructions which, when implemented, cause a computer to carry out the steps of a method for solving mathematical programming problems, the method comprising:

generating at least one solution to a mathematical programming problem to be solved at a first particular time point in a first-time-point-solution generating step;

generating a plurality of mathematical programming problems to be solved at a second time point after the first time point on the basis of the solution to the mathematical programming problem to be solved at the first time point in a second-time-point-solution generating step;

calculating an optimum value of each of a plurality of mathematical programming problems to be solved at the second time point;

estimating a relational expression between the solution to the mathematical programming problem to be solved at the first time point and an optimum value of a mathematical programming problem to be solved at the second time point;

correcting the mathematical programming problem to be solved at the first time point on the basis of the relational expression; and acquiring a scenario representing a variation of a circumstance to which the solution to the mathematical programming problem is applied, wherein the second-time-point-problem generating step performs simulation on the basis of the scenario to generate parameters of the mathematical programming problems to be solved at the second time point.

* * * * *